United States Patent [19]
Becker et al.

[11] 3,792,423
[45] Feb. 12, 1974

[54] ISOMETRIC IMAGING SYSTEM

[75] Inventors: Frederick L. Becker; Richard L. Trantow, both of Richland, Wash.

[73] Assignee: The United States of America as represented by the U.S. Atomic Energy Commission, Washington, D.C.

[22] Filed: May 24, 1972

[21] Appl. No.: 256,300

[52] U.S. Cl.................. 340/5 MP, 73/67.7, 343/7.9
[51] Int. Cl.............................................. G01s 9/66
[58] Field of Search... 340/3 C, 3 R, 5 MP; 343/7.9; 73/67.7, 67.8 R

[56] References Cited
UNITED STATES PATENTS
3,044,058   7/1962   Harris................................. 343/7.9

Primary Examiner—Richard A. Farley
Attorney, Agent, or Firm—John A. Horan

[57] ABSTRACT

An isometric imaging system for effecting the projection of a three-dimensional coordinate system onto the horizontal and vertical plane of a conventional display scope is provided. The system provides for displaying both spatial and depth information by the novel transformation of the time coordinates of the scanned field, which contains the object, to the horizontal and vertical coordinates of the display scope. In one embodiment a novel sample and hold circuit is provided for processing data on tapes at playback factors greater than 10.

3 Claims, 3 Drawing Figures

ISOMETRIC IMAGING SYSTEM

BACKGROUND OF THE INVENTION

The invention described herein was made in the course of, or under, a contract with the U. S. Atomic Energy Commission. It relates generally to imaging systems and more specifically to an isometric imaging system.

Heretofore various techniques have been devised in the electronic art for imaging viewed objects. These have included, for example, both two-dimensional and true three-dimensional display systems. Where three-dimensional imaging systems have been devised, dual cathode ray tube (CRT) displays have been generally utilized. Such is the case in sonar display systems. In the area of detecting and mapping objects in opaque liquids, as well as non-destructive testing of solids for internal flaws, ultrasonic imaging, which typically utilizes either a B or C scan two-dimensional display system, has found widespread usage. In the C-scan technique, a short ultrasonic pulse is transmitted by a transducer in the direction of an object which is to be imaged. The reflected signals from the surfaces of the object and/or internal flaws are then detected by the same transducer and the detected signals are amplified and time gated to include only those areas of the object to be imaged. This detected signal is finally recorded as a single point on a recording device which is scanned in synchronization with the transducer. The B-scan technique is similar except that time or depth information from a single cross section is displayed on the face of a cathode ray tube (CRT). In the case of both the B and C scan techniques, the resulting image is a flat pattern of the viewed object. Hence, both of these excellent analytical tools suffer a basic shortcoming in the fact that both spatial and depth information cannot be displayed on a single record. Accordingly, in the specialized area, for example, of evaluating the true nature of an unknown object or flaw these techniques leave much to be desired.

The discovery of holography, both optical and ultrasonic, for imaging viewed objects has afforded basic improvements over the earlier developed ultrasonic B- and C- scan techniques. With ultrasonic holography both spatial and depth information are recorded simultaneously but it does not, however, produce a three-dimensional image as is in fact produced in optical holography due to the difference in wave length between the ultrasound and the laser light used in the reconstruction of the hologram. The inability to focus the reconstructing lense at only one particular depth while all other depths remain out of focus presents limitations to ultrasonic holography as an analytical tool, as well as the considerable cost associated with such a technique.

It may thus be seen that while many excellent imaging systems have been devised it is desirable to have an inexpensive imaging system which affords the displaying of both spatial and depth information about a viewed object.

SUMMARY OF THE INVENTION

It is therefore an object of this invention to provide an isometric scanning system.

Another object is to provide an imaging system wherein spatial and depth information of a viewed object are recorded simultaneously as an isometric projection on a display.

Still another object is to provide an ultrasonic imaging system for viewing objects in opaque liquids, such as liquid sodium.

A further object of this invention is to provide an imaging system wherein the image of the viewed object may be rotated and/or tilted to obtain optimum perspective.

Still a further object is to provide an economical, easy to operate imaging system which utilizes an isometric projection of a viewed object on a two-dimensional display device, generally a cathode ray tube.

Another object is to provide an ultrasonic isometric imaging system useful in detecting flaws in solids.

A feature of the present invention is a novel isometric display circuit.

Other objects of the present invention will become apparent to those skilled in the art as the description proceeds.

The present invention generally comprises an isometric scanning system as hereinafter described by reference to several drawings depicting the separate features and/or combination of the separate features for the overall system.

BRIEF DESCRIPTION OF THE DRAWINGS

To facilitate an understanding of the invention, reference is made to the several drawings of which.

DESCRIPTION OF THE PREFERRED EMBODIMENT

Figure 1:
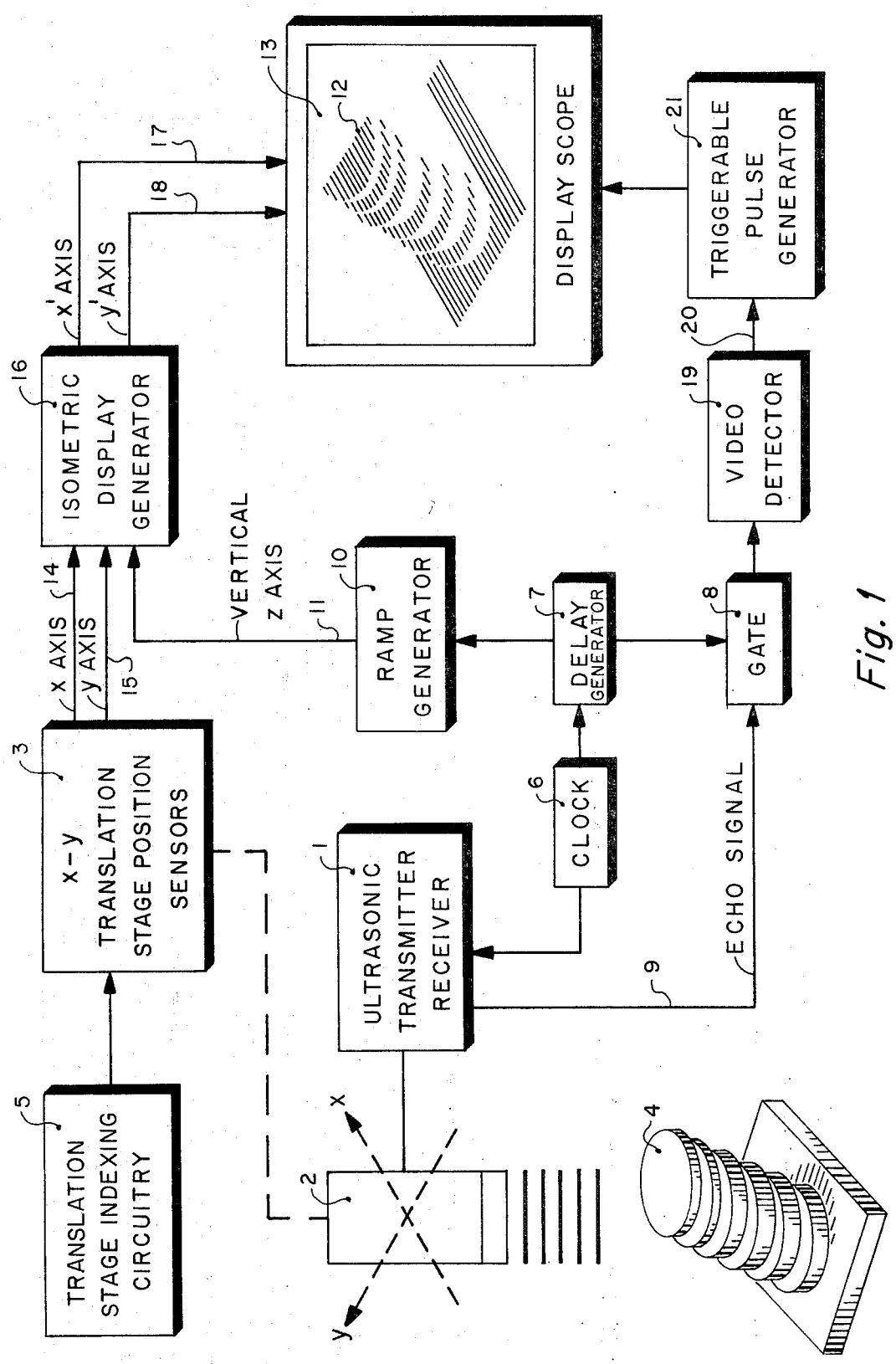
FIG. 1 is a block diagram of the present isometric imaging system using ultrasonic signals and in particular depicts an isometric projection on a display scope of stacked discs as the viewed object wherein the spatial and depth information thereof is readily apparent.

The block diagram given in FIG. 1 depicts the present invention in a general fashion. While it is to be understood that the isometric imaging system may be utilized to depict a variety of signals, the invention will be described hereinafter with particular regard to an isometric imaging system for depicting signals generated by ultrasonic means such as would be useful in LMFBR applications (i.e., under sodium viewing). For this any of the well known ultrasonic systems for viewing objects in opaque fluids may be used to generate to detect a given signal. One such embodiment may comprise an ultrasonic transmitter-receiver 1, a transducer 2, and an X-Y scanner 3. An object 4 is positioned such that short ultrasonic pulses from transmitter-receiver 1 are reflected off the surface of the object 4 and detected by transducer 2, the position of which is controlled by translation stage indexing system 5. The detected signals are then amplified in the receiver section of 1 and time gated to include only those areas of the object to be imaged. A clock 6 which is a pulse generator controls the repetition rate of the transmitter-receiver 1 and is the time reference from which all time or depth information is measured. A delay generator 7 is adjusted for a delay equivalent to the transit time (down and back) of the highest elevation to be viewed and a pulse width equivalent to the depth of field of the desired image. Gate 8 then accepts echo signals 9 from the desired depth ranges. The leading edge of this pulse is also used to trigger ramp generator 10. It should be seen that the height of the ramp voltage 11 at any point in time represents a particular depth of Z axis coordinate.

The isometric projection 12 of the viewed object 4 is achieved on the display scope 13 in accordance with the present invention, by feeding a (Z axis) ramp voltage 11, along with the X and Y position voltages 14, 15 respectively, into the isometric display generator 16. The X' horizontal signal 17 and the Y' vertical signal 18 are connected to the X and Y inputs of the display scope 13. The received ultrasonic echo signal 9 is time gated 8 and video detected 19. The video signal 20 is then fed to a pulse generator 21 which modulates the display scope 13 to record a dot at the X', Y' coordinates which correspond to the X, Y, and Z coordinates of the object 4 from which the echo signal 9 was reflected.

As may be seen from FIG. 1 the isometric projection 12 of the viewed object 4 affords a clear and distinct advantage over the conventionally transmitted C-scan which is characteristically quite flat, providing no perspective of the viewed object 4. Thus the serious drawback to C-scan or B-scan imaging — that is the fact that both spatial and depth information cannot be displayed on a single record — is obviated by the present invention. It will also be noted that the isometric projection 12 of the entire object 4 is in focus with a highly accurate depth resolution. Accordingly, all of the advantages of a true three-dimensional imaging system are obtained with the present isometric imaging system.

Figure 2:
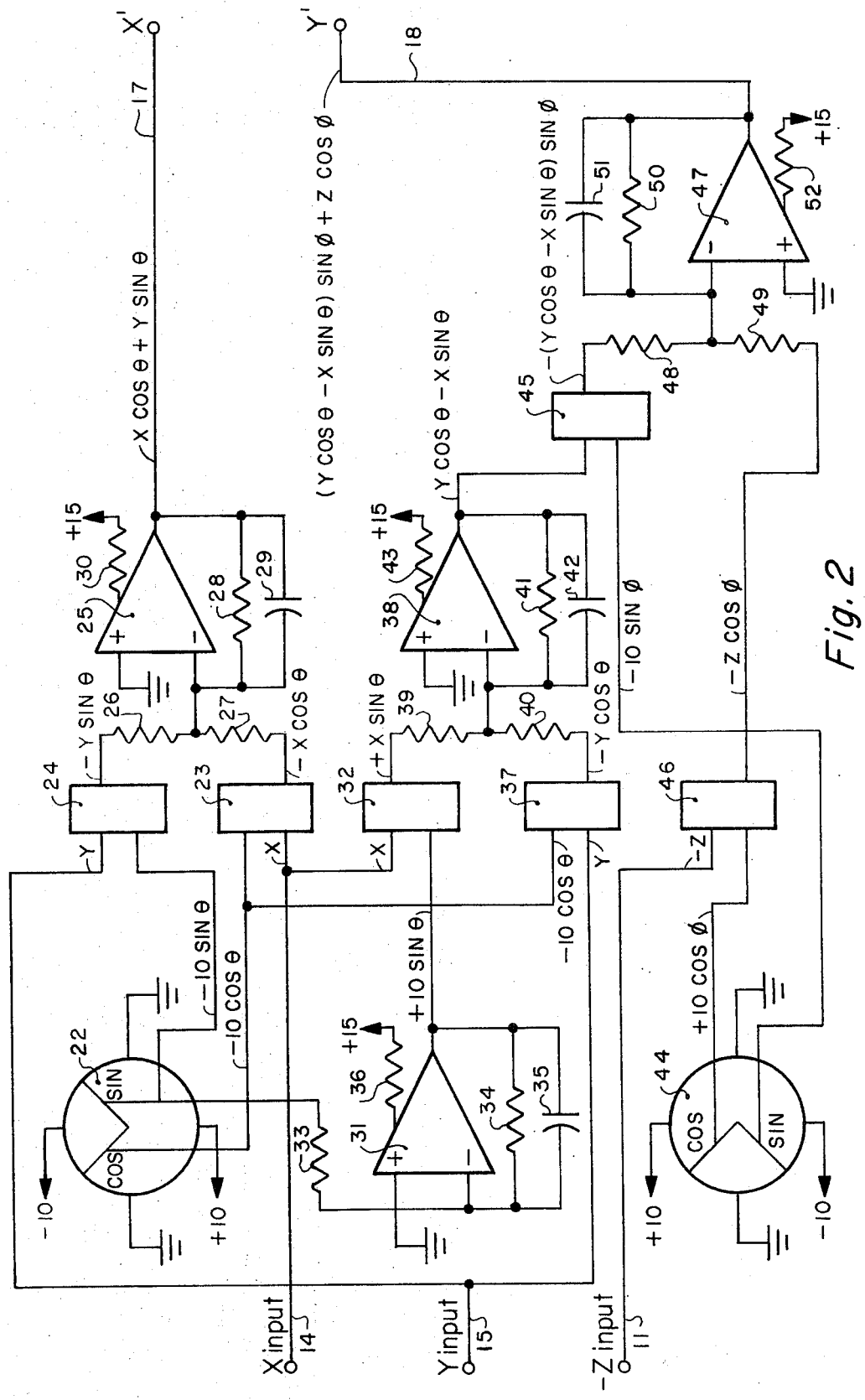
FIG. 2 is a schematic diagram of a circuit which transforms the X and Y position voltages of the viewed object along with the Z axis ramp voltage to the X', Y' time coordinates of a display scope.

Referring to FIG. 2 there is shown a circuit for the isometric display generator 16 which converts the X and Y position voltages 14 and 15 and Z axis ramp voltage 11 (i.e., time coordinates of the scanned field) to the X' horizontal signal 17 and the Y' vertical signal 18 of the display scope 13. This transformation is in accordance with the following formulas:

$$X' = X \cos \theta + Y \sin \theta \quad (1)$$

$$Y' = (Y \cos \theta) \sin \phi + Z \cos \phi \quad (2)$$

Where $\theta$ is the rotation of the X, Y axis and $\phi$ is the tilt of the Z axis. Equation (1) and the terms inside the parentheses of Equation (2) correspond to a rotation of the object 4 while the $\cos \phi$ and $Z \sin \phi$ terms appropriately modify the vertical perspective to correspond to tilting of the object 4.

Referring to the circuit shown in FIG. 2 the X input voltage 14 which represents the X coordinate of the transducer 2, is first multiplied by the negative D.C. quadrature voltage of sin-cosine potentiometer 22 by multiplier 23. The Y input voltage 15 which represents the Y coordinate is similarly multiplied by the negative D. C. quadrature voltage of sin-cosine potentiometer 22 by multiplier 24. The outputs from multiplier 23 and multiplier 24 are then summed by operational amplifier 25 to provide the X' output voltage 17. Operational amplifier 25 which is utilized in the unity gain inverting configuration is comprised of load resistors 26, 27, feedback resistor 28, capacitor 29 and balancing resistor 30.

The negative sin D. C. quadrature voltage of sin-cosine potentiometer 22 is inverted by operational amplifier 31 and the resulting value is multiplied by the X input voltage 14 using multiplier 32. Operational amplifier 31 which is also utilized in the unity gain inverting configuration comprises load resistor 33, feedback resistor 34, capacitor 35, and balancing resistor 36.

The negative cosine D. C. quadrature voltage of sin-cosine potentiometer 22 is multiplied by the Y input voltage 15 by multiplier 37. The product is then summed with the product of multiplier 32 and the sum inverted using operational amplifier 38 which is utilized in the unity gain inverting configuration and is comprised of load resistors 39 and 40, feedback resistor 41, capacitor 42 and balancing resistor 43. The resulting sum is next multiplied by the negative quadrature voltage of sin-cosine potentiometer 44 using multiplier 45.

The Z input 11 (value negative to provide an increasing time, i.e., more positive ramp signal, equivalent to a negative going Z axis coordinate) is first multiplied by the positive cosine output of sin-cosine potentiometer 44 using multiplier 46. The output of multiplier 45 is then summed with the output of multiplier 46 and the sum inverted by operational amplifier 47 which is comprised of load resistors 48 and 49, feedback resistor 50, capacitor 51 and balancing resistor 52, yielding Y' output 18. Equations 1 and 2 which represent the transformation depicted in the circuit shown in FIG. 2 may thus be seen to represent the projection of a three-dimensional coordinate system onto the X', Y' plane of the display scope 13.

It will be appreciated by those skilled in the art that selection of the various components of the circuit employed to carry out the novel transformation herein before described may vary over a wide range, depending generally on the frequency requirements of the X, Y input position voltages and Z axis ramp voltage. The circuit as shown in FIG. 2, for example, will process X and Y position voltages up to 100 KHz and Z axis ramp voltages up to 1 MHz with the following component selection: Operational amplifiers 25, 38 and 47 comprising an LM 201 which is commercially available from National Semiconductor Corp; operational amplifier 31 is a 3341 which is commercially available from Burr Brown Research Corp; multipliers 23, 24, 32, 37 and 45 comprising a medium frequency response device 432 J which is commercially available from Analog Devices Inc; multiplier 46 comprising a high frequency response device 422 A which is commercially available also from Analog Devices Inc.

Advantageously this large bandpass is achieved by utilizing high frequency operational amplifiers, multipliers and by multiplying the signal by a DC quadrature voltage rather than passing the signal through the sin-cosine potentiometers. All of the multipliers are solid state devices having outputs equal to the product of the two inputs divided by 10. The divisor is used to limit the magnitude of the product. Operational amplifier 31 requires a load resistor 33 having a value at least 10 times the input resistance of sincosine potentiometer 22.

Where such a high frequency capability is not required, component selection is less stringent and may beneficially afford better high frequency noise rejection.

In evaluating an image of an unknown object or flaw, it is highly desirable to view the image from several perspectives without re-scanning the aperture. This can readily be accomplished, for example, by recording the X, Y, and Z information on an endless magnetic tape loop and then playing it back at high speeds into the isometric display generator 16. In this manner the rotation and tilt of the image may be viewed by adjustment of the controls of the isometric display generator as the image is continuously regenerated. This feature of the present invention affords, advantageously, the selection of the optimum perspectives for evaluating the flaw or object in a relatively short period of time without requiring re-scanning of the object. Moreover, ease of operation is assured in that the present system allows rotation of the image as a function of only two angular parameters ($\theta$ and $\phi$) with a fixed relationship between the X and Y axis, as opposed to heretofore three angular parameters.

Image regeneration times on rapid playback of recorded data depends on two factors, the original scanning time and the playback speed. When the test or playback speed is increased, the signals are on the display scope 13 for a correspondingly shorter time. At normal speeds a pulse of approximately 2 $\mu$ seconds in duration from pulse generator 21 is required to modulate the display scope 13; this is the lower limit of, for example, Textronics 611 display scope, commercially available from Textronics Inc. For a scan time of two minutes and a tape speed increase of 60, an image could, for example, be regenerated every 2 seconds. If the repetition rate of clock 6 is 1KHz and the playback speed is increased by a factor of 60, the period of the ramp signal voltage 11 would be less than 16 $\mu$ seconds, depending upon the delay time of delay generator 7. A 2 $\mu$ second modulation pulse from pulse generator 21 would therefore considerably degrade the vertical resolution for this situation in that the smallest resolvable element would be one-eighth of the total depth. A novel sample and hold circuit shown in FIG. 3 has been devised for processing data at tape playback factors greater than 10.

Figure 3:
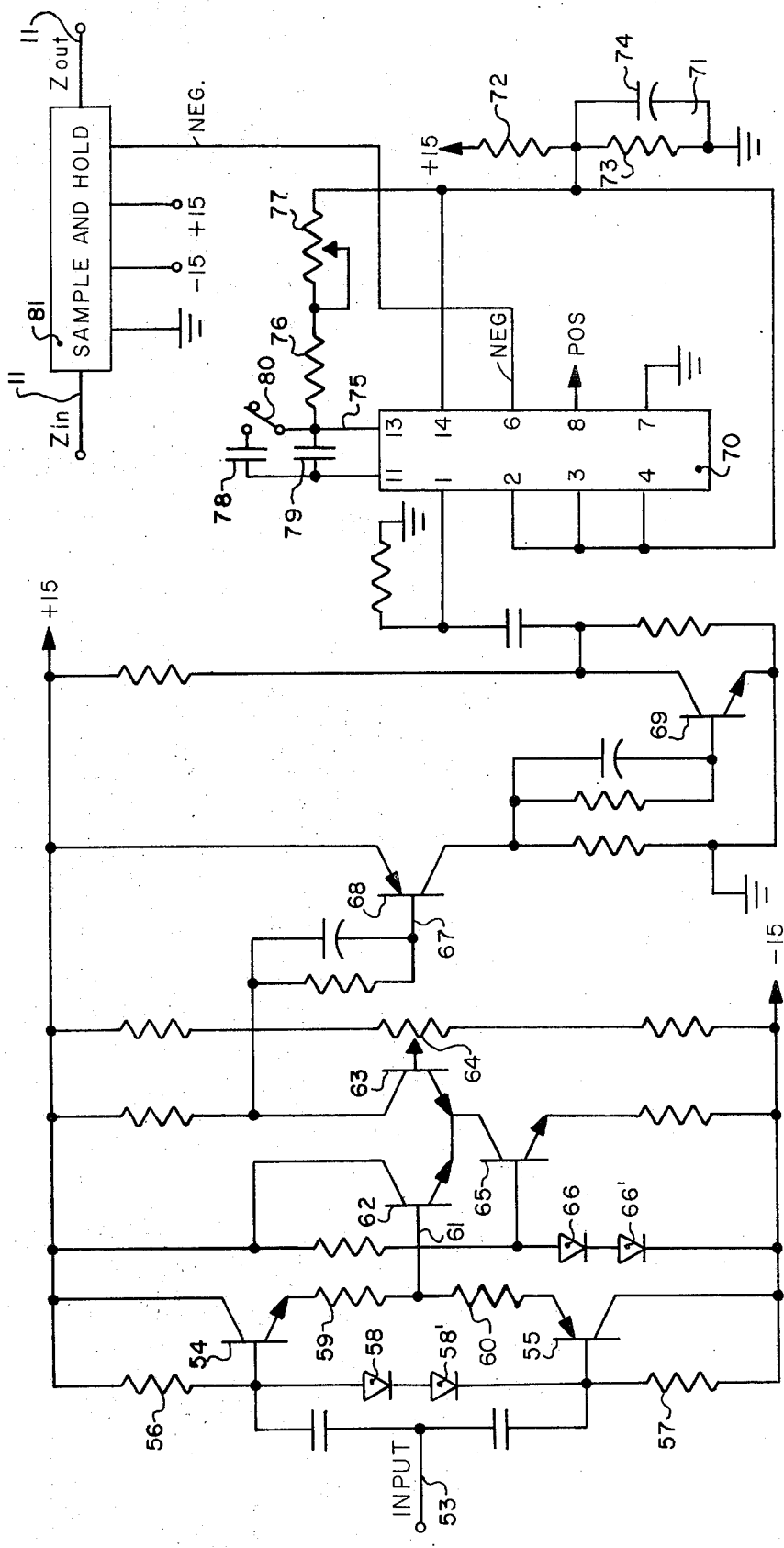
FIG. 3 is a schematic diagram of a sample and hold circuit, which samples the Z axis signal and holds it at the amplitude which corresponds to the arrival of an incoming echo signal.

Referring to FIG. 3, the circuit consists, broadly, of three major parts: A discriminating pulse shaper detector, an integral circuit monostable multivibrator and a solid state sample and hold module. The input to this circuit may be either the detected video signal 20 or the gated echo signal from gate 8.

More specifically, the input 53 to the discriminating pulse shaper is connected to a complementary pair, unity gain, buffer amplifier consisting of NPN transistor 54, PNP transistor 55, bias resistors 56 and 57, biasing diodes 58, 58' (which separates the bias of transistors 54 and 55 by 1.2 volts) and emitter resistors 59 and 60. A positive pulse at the input 53 results in a positive pulse at base 61 of transistor 62; likewise a negative pulse at input 53 results in a negative pulse at base 61. When the signal on base 61 exceeds a threshold level, which is determined by the bias on transistor 63 (which is set by potentiometer 64) the current through transistor 65 is shifted from transistor 63 to 62. Diode pair 66, 66' similar to diode pair 58, 58' controls the bias on transistor 65. By this arrangement a differential comparator is provided whereby the incoming signal for base 61 of transistor 62 is compared to a preselected signal level of potentiometer 64 and a signal is passed to base 67 of transistor 68 only for those signal inputs which exceed the preselected signal value.

By the shift of current from transistor 63 to transistor 62 a positive pulse is impressed at the base 67 of transistor 68 and the signal inverted and level shifted by transistor 68. The signal is then reinverted by transistor 69, resulting in a positive pulse at pin 1 of the monostable multivibrator 70. Supply voltages ($\approx 10$ volts) which are obtained from voltage divider 71 (comprised of resistors 72 and 73 and capacitor 74) are applied to pins 2, 4, and 14 of multivibrator 70.

A positive going pulse at pin 1 of multi-vibrator 70 results in a negative pulse at pin 6 and a positive pulse at pin 8, the length of the pulse being determined by the resistor capacitor network 75, which is comprised of resistors 76, 77; capacitors 78, 79; and range switch 80.

A negative control pulse to the sample and hold module 81 causes it to hold the Z input voltage 11 present at that instant for the duration of the pulse.

The circuitry of FIG. 3 utilizes standard commercially available components. Transistors 54 and 69 are type 2N3904; 55 and 68 are type 2N3906; 62, 63 and 65 are type 2N3415. Diodes 58, 58' and 66, 66' are type 1N4149. Monostable multivibrator 70 is a 9601 integrated circuit. Sample and hold module 81 is a SHH-1A available from Analog Devices Inc.

In operation, the sample and hold module 81 is placed between the ramp generator 10 and the isometric display generator 16 and the positive output from pin 8 of multi-vibrator 70 is connected to pulse generator 21. The pulse length of positive and negative outputs of multi-vibrator 70 is adjusted to end just prior to the initiation of the next Z ramp signal 11. By this arrangement, the frequency content of the sample and hold module 81 is now no longer dependent upon the ramp signal 11 repetition rate but is dependent upon the scanning rate of the X-Y scanner 3 and the nature of the object. These values are, typically, at least 100 to 1,000 times smaller than the repetition rate of the ramp signal 11. Hence, this reduction of required band width considerably reduces component requirements and makes high tape playback speeds, such as 60 times the recording speed, feasible.

The present invention is particularly useful in the field of imaging in opaque liquids, such as liquid sodium, and thus could be used in Liquid Metal Breeder Reactors as a method for determining the position and condition of fuel bundles and the detection of foreign objects. Another application of the present isometric imaging system is for nondestructive testing (imaging of flaws in solids). For this application the present system provides the operator considerably more information as to the true nature, depth and position of scanned objects than can be obtained from either B or C conventional scanners.

The detailed description hereinbefore given is intended to be illustrative only. Obviously many variations may be provided by those skilled in the art for providing an isometric imaging system without departing from the intended scope of this invention. For example, the system is described with particular reference to an X-Y scanner for indicating the position of the object. Other position indicators, such as a circular scanner could be used. A circular scanner may, for example, comprise rotating shaft and disk to which a transducer is attached. The shaft is also translated in one direction, which results in the transducer scanning out a helical path. This can be accomplished much faster than X-Y scanning.

Additionally, output amplifiers and offset controls may be incorporated to provide for magnifying a particular portion of the displayed image, such as that depicting an internal flaw, for detailed study and positioning it in the center of the display screen.

It is therefore to be understood that the scope of the present invention is to be determined only in accordance with what is claimed in the appended claims.

What is claimed is:

1. An isometric imaging system for displaying a viewed object comprising:
   a. means for generating and detecting signals incident to and reflected from said object;
   b. means for generating X, Y, and Z output voltages corresponding to the coordinate position of said object;
   c. means for electronically generating coordinates corresponding to an isometric projection of said object from said X, Y, and Z output voltages;
   d. means for varying the angular perspective of said isometric projection;
   e. means for displaying said isometric projection; and
   f. means for magnetically recording and playing back the signals corresponding to the isometric projection of said object, so that in conjunction with said means for varying the angular perspective of said isometric projection, alternate angular perspectives can be readily displayed.

2. The apparatus of claim 1 wherein:
   a. said means for generating and detecting signals comprises an ultrasonic transmitter-receiver, transducer, and an X-Y scanner;
   b. said means for electronically generating an isometric projection and said means for varying the angular perspective of said projection comprises an electronic circuit adapted to receive said X, Y, and Z axis voltages, to transform same into X', Y' coordinates by the formulas:

$$X' = X \text{ cosine } \theta + Y \text{ sine } \theta$$

$$Y' = (Y \text{ cosine } \theta) \text{ sine } \phi + Z \cos \phi$$

where $\theta$ is rotation of the X, Y, axis and $\phi$ is the tilt of the Z axis, and further adapted to provide variation of angular perspective by varying the parameters $\theta$ and $\phi$.

3. The apparatus of claim 2 wherein said electronic circuit for generating an isometric projection and varying the angular perspective of said projection comprises:
   a. a sine-cosine potentiometer for analogically generating the functions negative sine $\theta$ and negative cosine $\theta$;
   b. a second sine-cosine potentiometer for analogically generating the functions cosine $\phi$ and negative sine $\phi$;
   c. an operational amplifier for inverting said negative sine $\theta$ function to produce the function sine $\theta$;
   d. a plurality of multiplier means electrically connected to said sine-cosine potentiometers, said operational amplifier, and said X, Y, and Z voltages to generate the functions negative $Y$ sine $\theta$, negative $X$ cosine $\theta$, sine $\theta$, negative $Y$ cosine $\theta$, and negative $Z$ cosine $\phi$;
   e. a summing operational amplifier electrically connected to said functions negative Y sine $\theta$ and negative X cosine $\theta$ to generate the function $X' = X$ cosine $\theta + Y$ sine $\theta$; and
   f. further operational amplifier and multiplier means electrically connected to said functions $X$ sine $\theta$, negative $Y$ cosine $\theta$, negative sine $\phi$ and negative $Z$ cosine $\phi$ to generate the function $Y' = (Y$ cosine $\theta - X$ sine $\theta)$ sine $\phi + Z \cos \phi$.

* * * * *